United States Patent [19]

Jay

[11] Patent Number: 4,989,504
[45] Date of Patent: Feb. 5, 1991

[54] FOOD PROCESSING VAT

[75] Inventor: Jeffrey L. Jay, Winsted, Minn.

[73] Assignee: Sherping Systems, Inc., Winstead, Minn.

[21] Appl. No.: 269,156

[22] Filed: Nov. 9, 1988

[51] Int. Cl.$^5$ .................. A01J 25/00; A23C 19/00; B01F 15/06

[52] U.S. Cl. ...................... 99/455; 99/453; 99/462; 99/466; 366/149; 366/300; 366/301; 366/325

[58] Field of Search ............... 99/452, 453, 458, 460, 99/462, 465, 466; 366/147, 149, 297-301, 325, 168, 172, 173; 241/98, 101.1; 426/581, 582, 583

[56] References Cited

U.S. PATENT DOCUMENTS

| | | | |
|---|---|---|---|
| 2,029,691 | 2/1936 | Robinson | 366/298 X |
| 2,584,225 | 2/1952 | Plunguian et al. | 366/177 |
| 3,049,750 | 8/1962 | Austin | 366/168 |
| 3,545,533 | 12/1970 | Matsuoka | 366/149 |
| 3,684,252 | 8/1972 | Nissle et al. | 366/168 |
| 3,858,855 | 1/1975 | Hazen | |
| 3,964,874 | 6/1976 | Maruko et al. | 366/149 |
| 4,093,419 | 6/1978 | Tauber et al. | 366/147 |
| 4,108,058 | 8/1978 | Sjoholm et al. | |
| 4,183,674 | 1/1980 | Sudo et al. | 366/147 |
| 4,206,880 | 6/1980 | Stanton | |
| 4,612,853 | 9/1986 | Kostiainen et al. | 366/292 |
| 4,752,139 | 6/1988 | Hauck | 366/299 |
| 4,758,095 | 7/1988 | Kanda et al. | 366/128 |
| 4,776,703 | 10/1988 | Oda et al. | 366/297 |
| 4,791,735 | 12/1988 | Forberg | 366/149 |
| 4,859,074 | 8/1989 | Asai et al. | 366/97 |

Primary Examiner—Timothy F. Simone
Attorney, Agent, or Firm—Dorsey & Whitney

[57] ABSTRACT

An enclosed food processing vat is provided having two or more generally horizontally-oriented partial cylindrical inner wall sections, each inner wall section conforming to a first portion of an swept volume created by the rotation of an agitator means about a horizontal shaft, the distance between the shafts being slightly greater than the radius of the swept volume so that a second portion of the swept volume for each shaft intersects and overlaps the swept volume of adjacent shafts. Each shaft is provided with a series of combined cutting and stirring paddles comprising a series of blades arranged both perpendicular to the shaft and parallel to the shaft that are sharpened on one side only and fixed so that when the shaft is rotated in one direction cutting will take place; whereas, when the shaft is rotated in the other direction stirring will take place. The stirring action is further enhanced by the orientation of certain perpendicular blades that act on the food product in a propeller-like manner creating a generally torroidal flow pattern of food product around the shaft of each inner wall section.

20 Claims, 6 Drawing Sheets

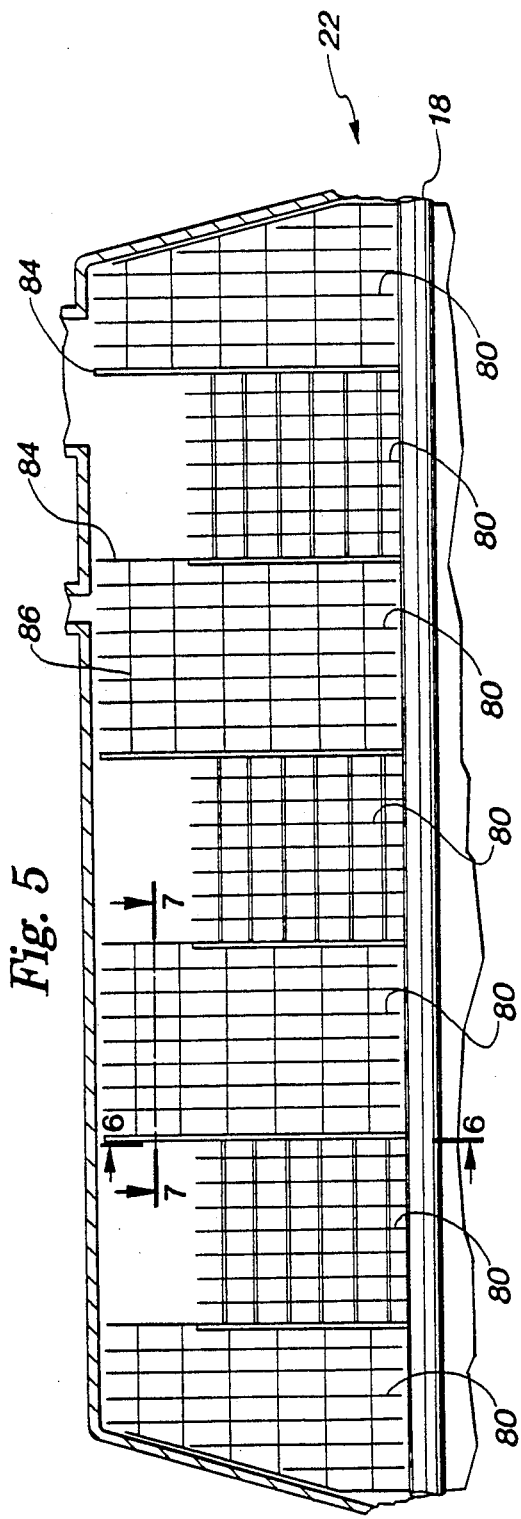
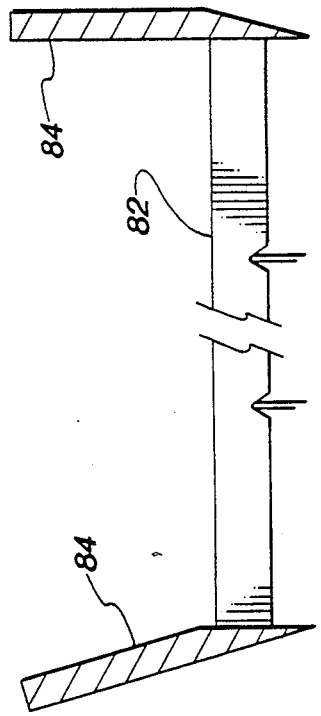
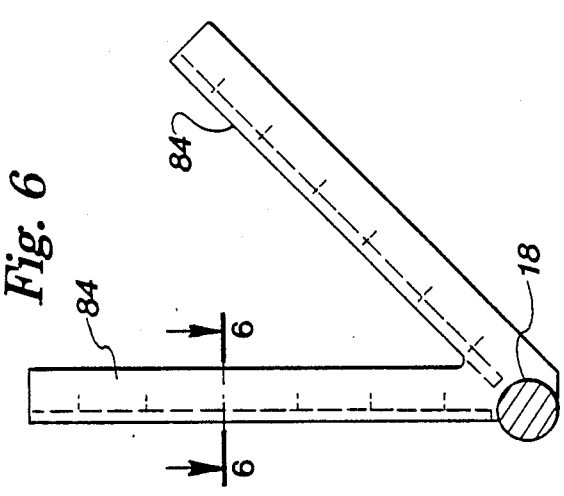

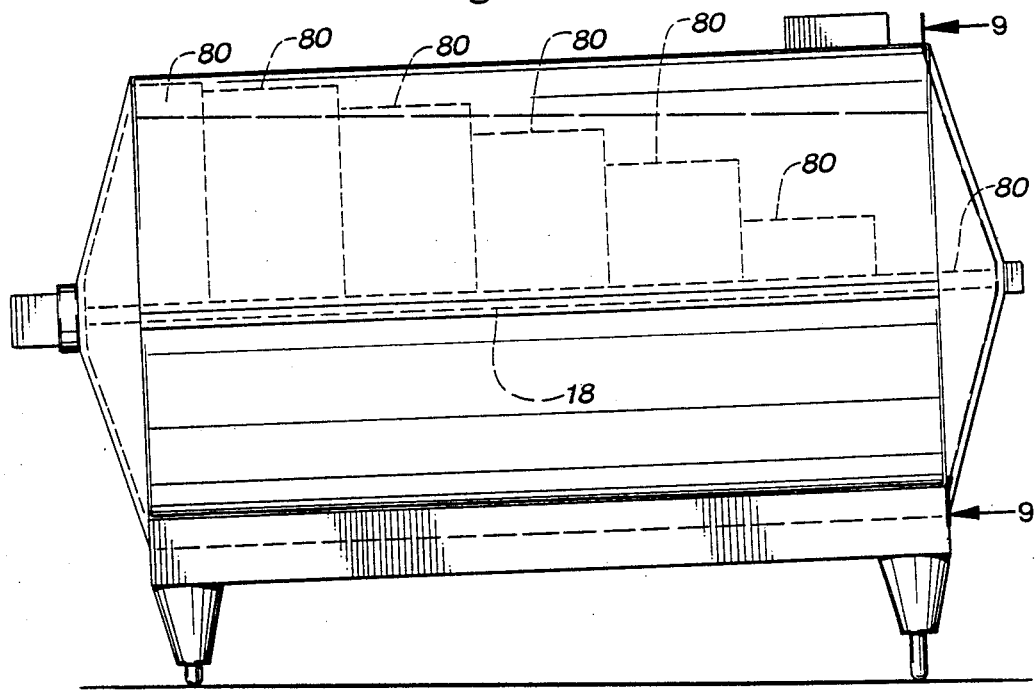
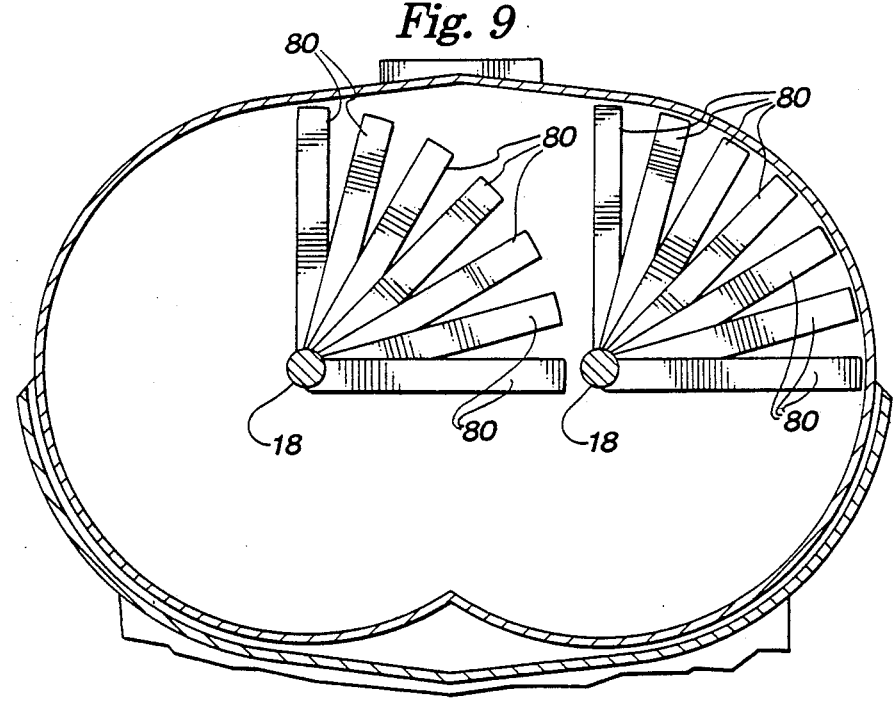

4,989,504

FOOD PROCESSING VAT

TECHNICAL FIELD

The present invention relates generally to the field of food processing equipment. More particularly, the present invention relates to a food processing vat for processing liquid-type food products such as cheeses and the like that is comprised of a closed vessel arranged in a plurality of horizontally oriented, partial cylindrical sections, each section having a separate agitator means, whereby the construction and operation of the vat minimizes the risk of mechanical damage to the food product being processed.

BACKGROUND OF THE INVENTION

Traditionally, the process for making cheese and other liquid-type food products involved the use of a processing vat that was open to the atmosphere. While simple to construct and convenient to use, the use of open-air vats gave rise to several problems, including the risk of airborne contamination of the vat contents and significant loss of process heat into the surrounding atmosphere.

To overcome these problems, fully enclosed vats or tanks were developed. U.S. Pat. No. 3,858,855 and U.S. Pat. No. 4,206,880 are examples or prior art cheese making vats that are fully enclosed. The vats in each of these patents utilize an agitator comprised of cutting and stirring paddles that is rotated around two vertical shafts within a vertically-disposed vessel comprised of two partial cylinders. Unfortunately, both of the vats described in these patents are inadequate for processing large capacities of food product because the cutting and stirring paddles become very cumbersome due to the relatively large radius of the partial cylinders. This large radius is necessitated by practical limitations as to the permissible depth of food product in the vat due to the effects of hydrostatic pressure on the food product as it is formed. For example, the hydrostatic pressure on the cheese curds during formation of the coagulum cannot exceed approximately a seven foot static head, depending upon the particular type of cheese being processed. It is also necessary to fit swinging deflector devices to the agitator in order to create lift in the vat to prevent the food product from settling to the bottom. This in turn reduces the efficiency of the agitator in the cutting mode. In the processing of cheese, for example, the singing deflectors damage the coagulum and release some of the butterfat into the whey thereby creating a less desirable end product.

U.S. Pat. No. 4,108,058 describes a fully enclosed cheese making vat in the form of a horizontal cylindrical vessel with a single horizontal shaft carrying the combined cutting and stirring paddles operate more effective due to their streamlined construction and a minimum of hinged deflector devices. As a result, there is less damage to the food product and a more even mixture of the food product because of the assistance of the normal gravitational effect on the food product as it is stirred or cut. In processing cheese, this type of vat produces lower losses of butterfat into the whey. Unfortunately, it is very difficult to cut the food product evenly in this type of vat due to the high ratio between the relative knife speed near the center of the vat and the relative knife speed near the periphery of the vat. In order to achieve an adequate cutting force near the center of the vat, it is necessary to operate the agitator in the cutting mode at relatively high speed. This tends to create an overcutting effect at the periphery resulting in finer particles of the food product than desired. For cheese products, the overcutting effect of this type of vat yields excessive curd fines. Another problems involved in constructing a horizontally-oriented food vat is in obtaining an adequate and sanitary seal at each end of the shaft as it extends through the ends of the vat.

Although the present designs for fully enclosed food processing vats are adequate for processing some types of food products, it would be advantageous to have a food processing vat that eliminates the risk of airborne contamination to the food product, reduces heat loss into the surrounding environment and maintains conditions throughout the food making process that minimize the risk of mechanical damage to the food product, yet still allow large capacities of food product to be processed at one time.

SUMMARY OF THE INVENTION

The present invention is directed to an enclosed food processing vat comprised of a horizontally-oriented vat having a two or more generally partial cylindrical inner wall sections, each inner wall section conforming to a first portion of an swept volume created by the rotation of an agitator means about a horizontal shaft. The horizontal shafts are disposed centrally within each inner wall section. the distance between the shafts being slightly greater than the radius of the swept volume created by the rotation of the agitator means so that a second portion of the swept volume for each shaft intersects and overlaps the swept volume of adjacent shafts. The vat is enclosed by a pair of end walls and a common top wall. In the preferred embodiment, the inner wall sections from a plurality of horizontally-oriented intersecting partial cylinders that give the interior of the vessel a vertical cross-sectional shape similar to a series of U-shaped troughs having a common top wall.

Each horizontal shaft is provided with an agitator means that is comprised of a series of combined cutting and stirring paddles extending radially outward from the shaft. Each paddle comprises a series of blades arranged both perpendicular to the shaft and parallel to the shaft. The blades are sharpened on one side only and fixed in such a way that if the shaft is rotated in one direction then the sharp edges of the blades will be presented to the food product and cutting will take place; whereas, if the shaft is rotated in the other direction the blunt sides of the blades will be presented to the food product and stirring will take place.

The stirring action is further enhanced by means of an angle of impingement applied to certain of the heavier perpendicular blades such that when rotated in the stirring direction these blades act on the product in a propeller like manner creating a generally torroidal flow pattern around the shaft of each inner wall section. The direction of rotation of the shafts is normally the same such that the flow patterns collide in the common second portion of the swept volumes of the inner wall sections. In another form of the invention, the shafts are arranged to contra rotate thereby creating opposite torrodial flow patterns around each of the shafts in the vat such that the flow patterns are in unison in the common second portion of the swept volumes of the inner wall sections.

Food product is introduced and withdrawn from the vat by an access means in the form of an inlet/outlet in the end wall. An outer shell surrounds the lower portion of the inner wall sections and is supported by a cradle structure for stabilizing the vat. Heating or cooling of the vat contents may take place by means of a heating and cooling jacket or other type of thermal media applied to the outside of the inner wall sections of the vat.

Accordingly, a primary objective of the present invention is to provide an enclosed food processing vat that eliminates the risk of airborne contamination o the food product, reduces heat loss into the surrounding environment and maintains conditions throughout the food making process that minimize the risk of mechanical damage to the food product.

Another objective of the present invention is to provide an enclosed food processing vat having a plurality of horizontally disposed shafts with associated agitator means for cutting and stirring the food product such that the rotational speed of the agitator means may be slower than the rotational speed of the agitator means for a single shaft vat of the same diameter.

A further objective of the present invention is to provide an agitator means for a food processing vat that will create an improved flow pattern of food product in the vat without excessive mechanical damages to the food product and without the need for hinged lifting apparatus associated with a vertically oriented agitator means.

Another objective of the present invention is to provide an enclosed food processing vat that is capable of processing large quantities of food product at one time without excessive mechanical damage to the food product.

These and other objectives of the present invention will become apparent with reference to the drawings, the description of the preferred embodiment and the appended claims.

DESCRIPTION OF THE DRAWINGS

FIG. 5 is a fragmentary sectional elevation taken along line 5—5 in FIG. 4.

FIG. 6 is a sectional detail of part of one agitator assembly slightly enlarged and taken along line 6—6 in FIG. 5.

FIG. 7 is a sectional top plan detail view slightly enlarged and taken along line 7—7 in FIG. 5 showing the orientation of the blades.

FIG. 8 is a left side elevational view of an alternate form of the agitator means of the present invention.

FIG. 9 is a fragmentary sectional elevational taken along line 9—9 in FIG. 8 and showing a shallow depth of field.

DESCRIPTION OF THE PREFERRED EMBODIMENT

Figure 1:
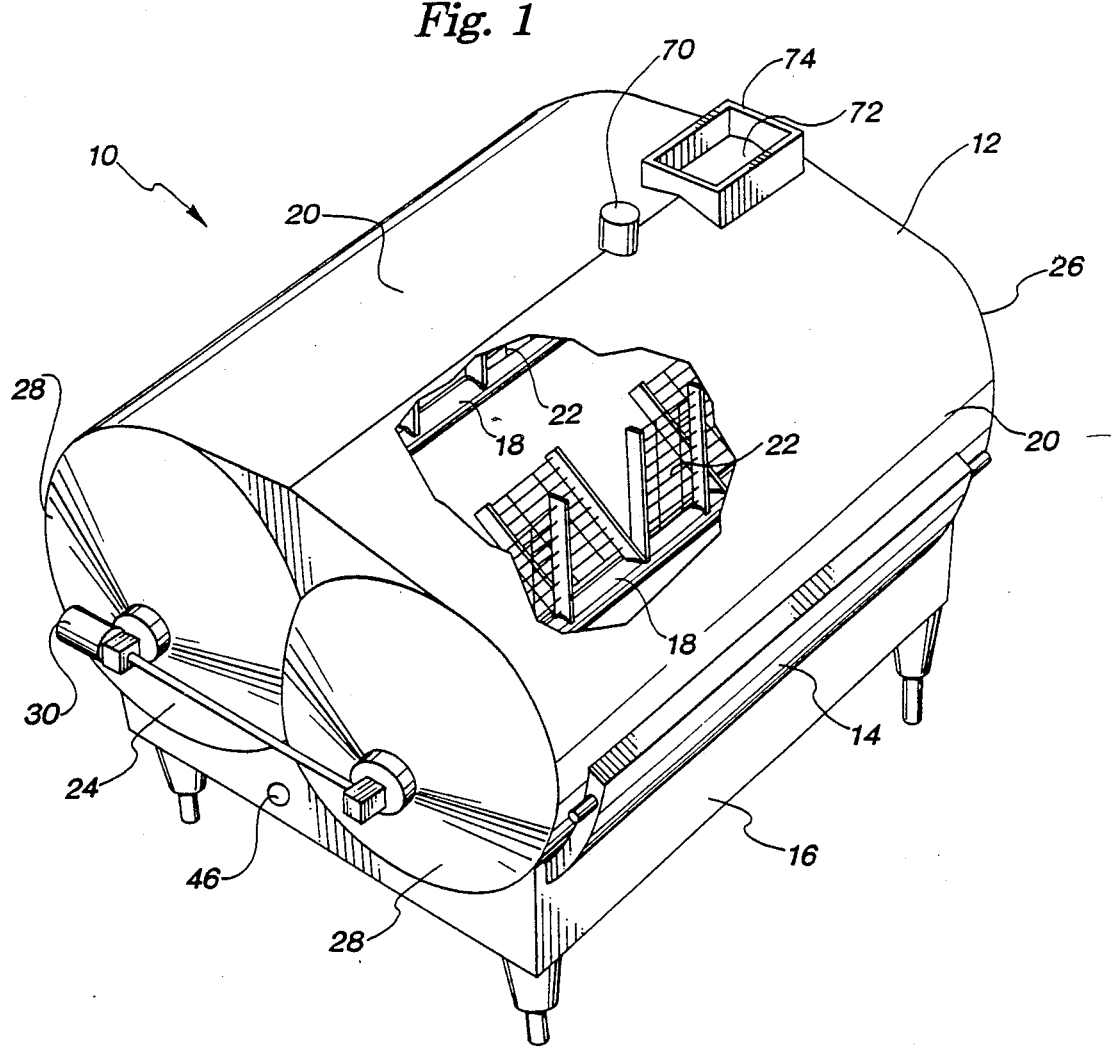
FIG. 1 is a perspective view of the present invention with parts cut away to expose the interior of the food processing vat.

Referring now to FIG. 1, the elements of the preferred embodiment of a vat 10 constructed in accordance with the present invention will be described. The vat 10 includes an inner shell means 12 made of stainless steel or other corrosion resistant material that is adapted to contain the food product (not shown). The inner shell means 12 is surrounded on its lower portion by an outer shell means 14 and is supported in a horizontal longitudinally-oriented position by a cradle means 16. A generally horizontally oriented shaft 18 is centrally disposed in each of two or more intersecting partially cylindrical inner wall sections 20 that form the inner shell means 12. Each shaft 18 is provided with an agitator means 22 extending radially outward from the shaft 18. A pair of end wall means 24 and 26 are joined to the edges of the inner wall sections 20 to close the ends of the inner shell means 12 to form a sealed vessel. Each end wall means 24 and 26 is comprised of a series of conically shaped end sections 28 having a vertical base cross section corresponding to the vertical cross section of the respective inner wall section 20. The shafts 18 are mounted in bearings at the apex of each end section 28 so that each shaft 18 is centrally disposed within the corresponding inner wall section 20. A drive means 30 is operably connected to the shafts 18 for rotating the shafts 18 and their corresponding agitator means 22.

Figure 3:
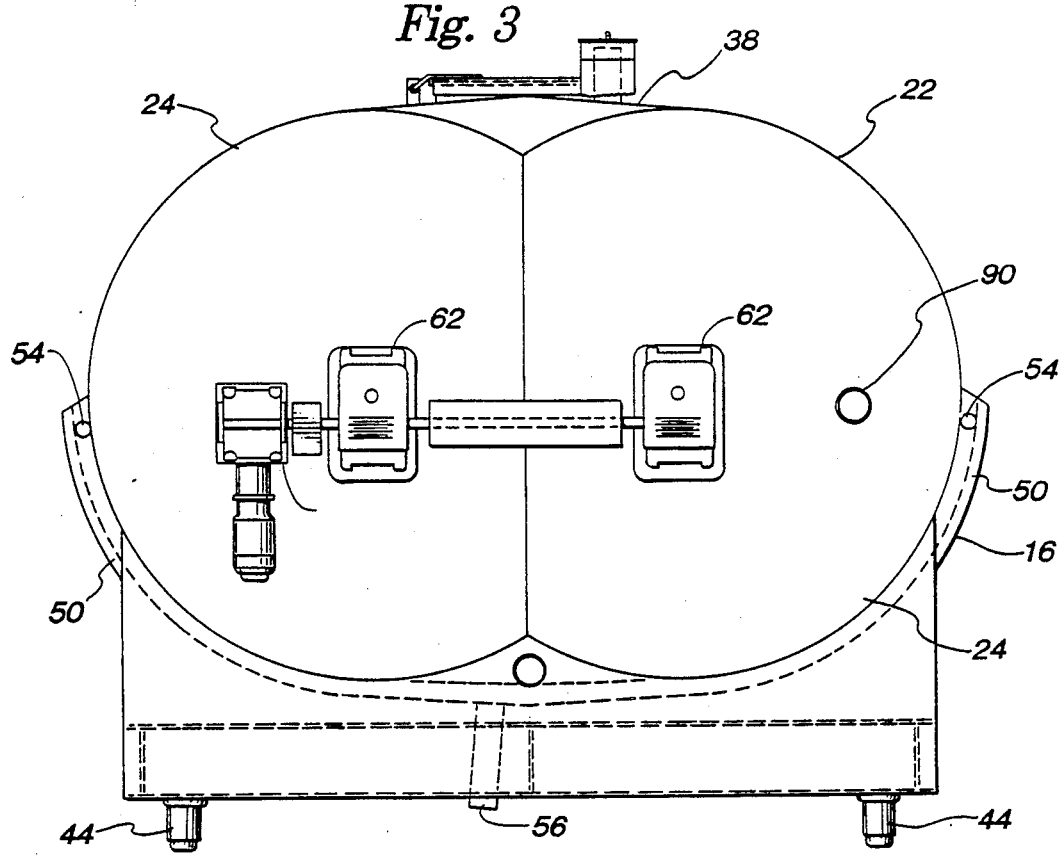
FIG. 3 is a front elevational view.
Figure 4:
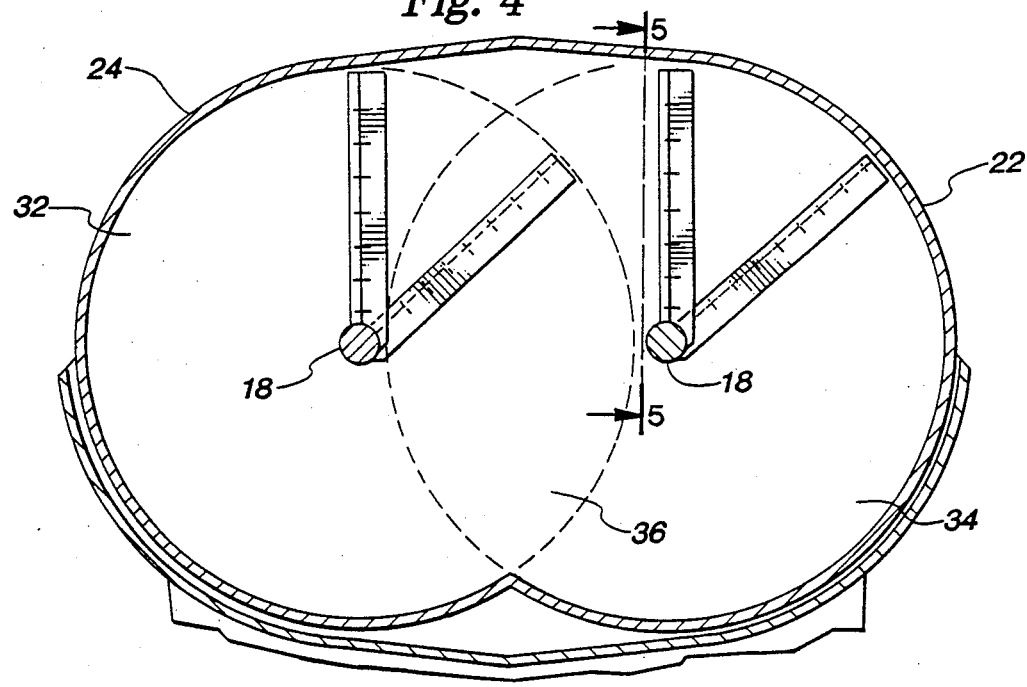
FIG. 4 is a fragmentary sectional elevation taken along line 4—4 in FIG. 2 and showing a shallow depth of field.

As best shown in FIG. 4, the vertical internal cross section of the inner wall sections 20 of the preferred embodiment is generally C-shaped, with the two cross-sections being mirror images of one another. The inner wall sections 20 are joined together at their horizontal intersection defined by a plane that bisects the distance between the shafts 18. A top wall section 38 may join the upper surfaces of the inner wall sections 20 as shown in FIG. 3. Although in the preferred embodiment, the internal vertical cross sections of the inner wall sections 20 are identical mirror images, the required shape of the internal cross section of the inner wall sections 20 is dictated by a swept volume 32 created by the rotation of the agitator means 22 about the shaft 18. The swept volume 32 is comprised of a first portion 34 corresponding to an area within the inner wall section 20 that does not intersect or overlap another swept volume 32, and a second portion 36 corresponding to an area that does intersect and overlap another swept volume 32. The shafts 18 are horizontally spaces apart by a distance greater than the larger of the radius of adjacent swept volumes 24. By utilizing an arrangement of smaller overlapping swept volumes 32, rather than a single volume corresponding to one horizontal shaft, the speed of rotation of the agitator means 22 may be decreased and still maintain sufficient force to stir and cut the food product without excessive mechanical damage to the food product and without excessive overcutting of the food product.

The radius of the swept volumes 32 and of the inner wall sections 20 is generally fixed at a single value for most vat capacities, especially where the vat 10 is used for hard or semi-hard cheese processing. This value is chosen to maintain hydrostatic pressure below a value that causes damage to the cheese coagulum during the early stages of the cheese making process and also to minimize the generation of curd fines caused by high peripheral blade speeds during cutting of the curd. Where the vat 10 is to be used exclusively for cottage cheese or other soft curd variety of food product, the radius of the inner wall sections can be reduced in order to improve the yield performance of the vat 10.

Figure 2:
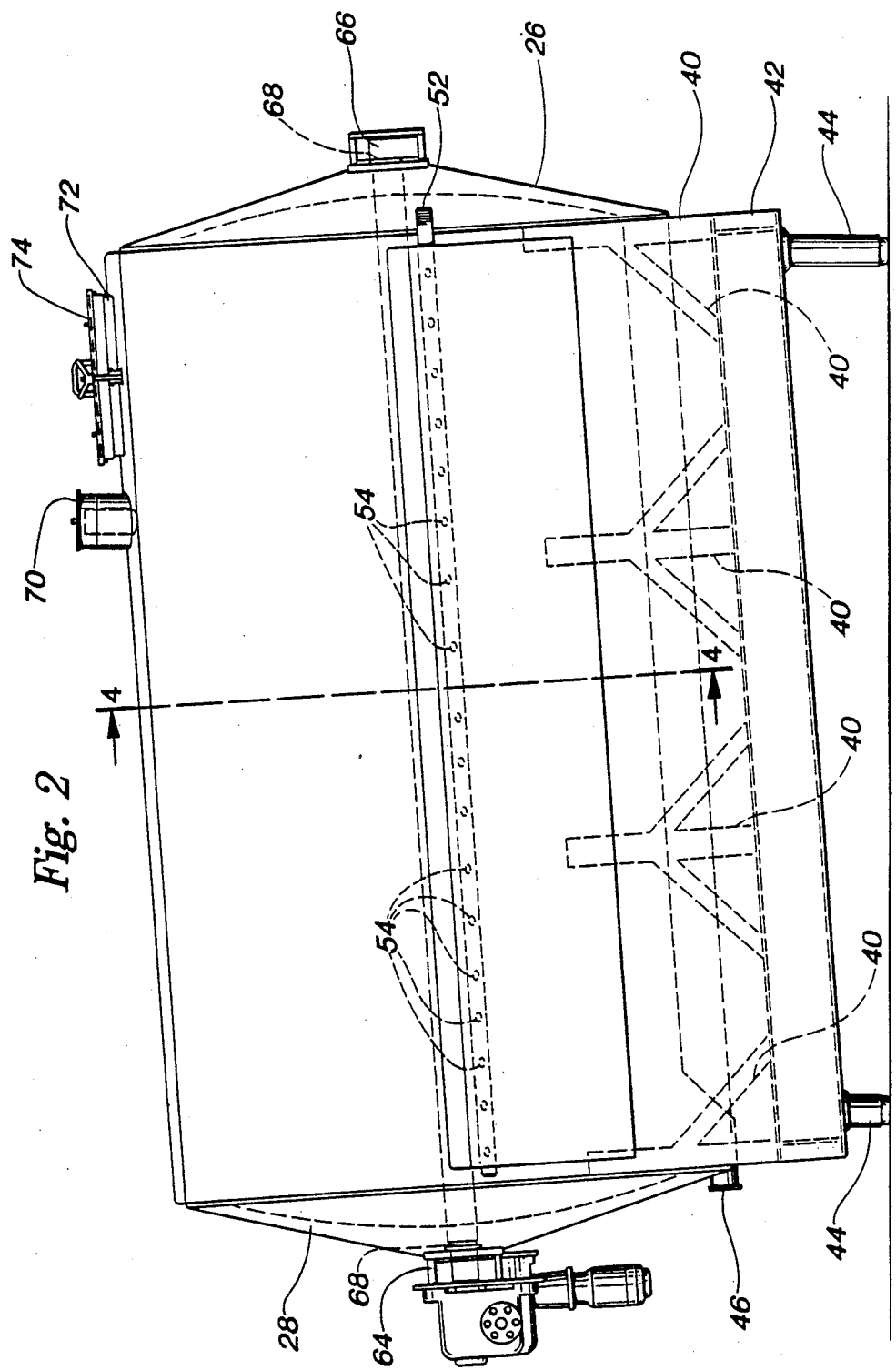
FIG. 2 is a left side elevational view of the present invention.

Referring now to FIGS. 2 and 3, the physical support structure for the vat 10 will be described. The cradle means 16 is comprised of a series of U-shaped cradle supports 40 used to support the inner shell means 12 and the outer shell means 14. The outer shell means 14 is held away from the inner shell means 12 by the cradle supports 40 that also provide shape retaining support for the inner shell means 12. The cradle supports 40 are mounted on an I-beam frame 42 that is used to provide stability to the structure of the vat 10 as a whole. The I-beam frame 42 is further mounted upon legs 44 that may be of different lengths to angle the slope of the inner shell means towards an outlet 46.

The outer shell means 14 is formed of stainless steel or other corrosion resistant material. This outer shell means 14 wraps around the lower portion of the inner shell means 12 leaving an annular space 50 that may be used for the application of heating or cooling media. In the preferred embodiment, steam, hot water, chilled water or other thermal media may be introduced into the annular space 50 between the inner shell means 12 and the outer shells 14 by means of a plurality of spray tubes 52. Each tube 52 is provided with a number of holes 54 that are oriented towards the inner shell means 12, thus allowing the heating or cooling media to be sprayed onto the outer surface of the inner wall sections 20. Condensate or used heating or cooling media is drained from the annular space 50 by means of an outlet 56.

The drive means 30 provides the rotational force to rotate the shaft 18 within each inner wall section 20. The drive means 30 comprises a motor 60 connected to a transmission means 62 that is connected to each shaft 18. The shafts 18 are driven in synchronization by a reversible motor 60 that is mounted on a support framework attached to the end wall means 24. The speed of the motor 60 is controlled by a variable frequency electrical supply or a mechanically variable gearbox may be fitted to control the output of the speed of the motor 60. The output of the motor after primary speed reduction in the form of a geared drive is fed to the input shaft of a first gearbox or transmission means 62 where rotational motion is transmitted to a first horizontal shaft 18 and also to the input shaft of a second gearbox or transmission means 62 that serves to drive a second horizontal shaft 18. In this way one motor 60 serves to drive both horizontal shafts 18.

The drive end of each shaft 18 is supported by a bearing 64 that forms an integral part of the transmission means 62. The non-drive end of each shaft 18 is supported by an external bearing 66. In order to prevent the food product contents of the vat 10 from escaping the inner shell means 12 through the bearings 64 and 66, a seal 68 is provided where each shaft 18 passes through the end wall sections 28. The seal 68 is of a special hygienic design and is arranged such that it can be cleaned in place. The preferred embodiment of the seal 68 is described in further detail and is the subject of a copending patent application filed concurrently herewith and assigned Ser. No. 269,154, U.S. Pat. No. 4,861,044 that is fully incorporated herein by reference.

Figure 10:
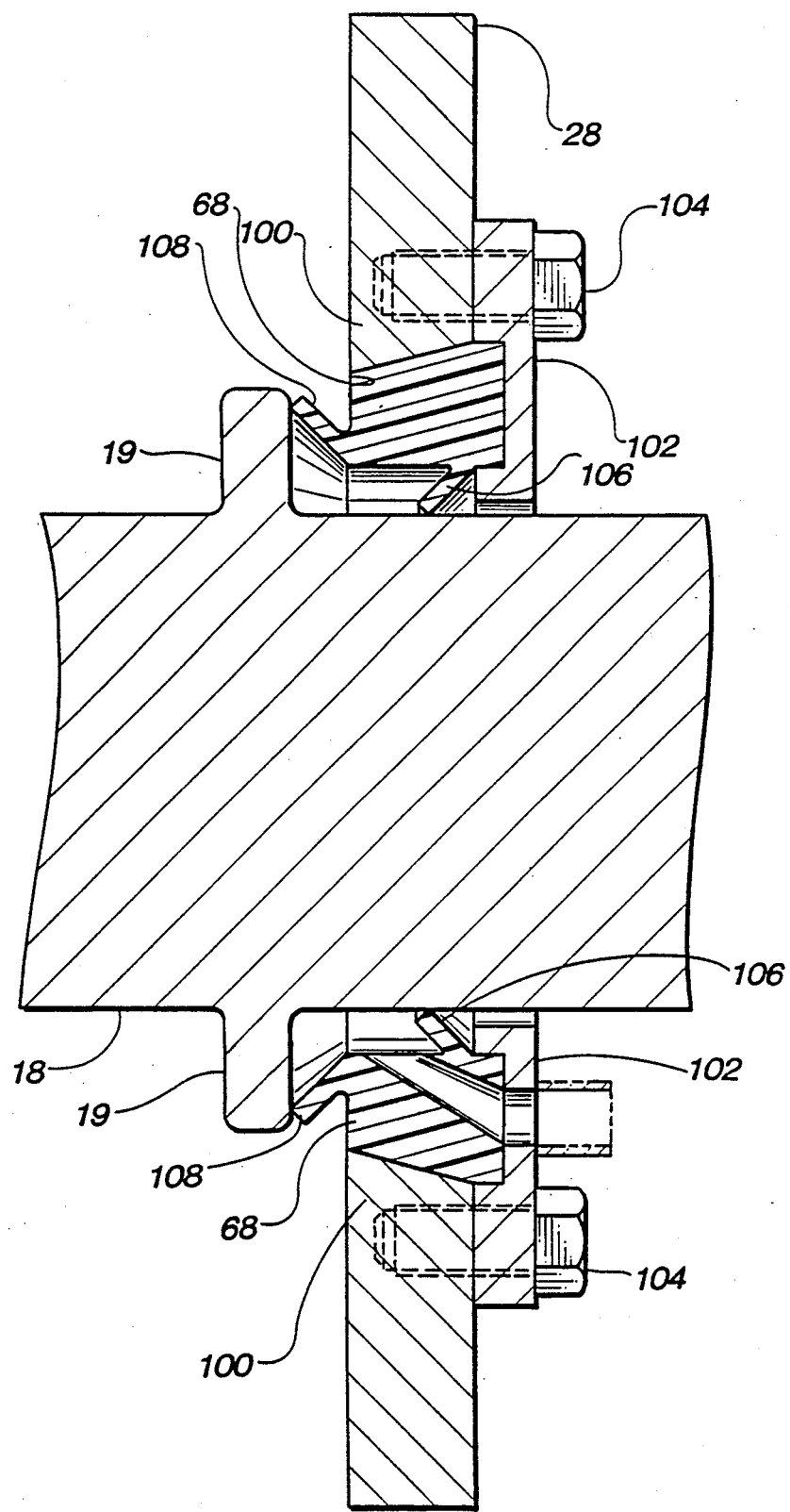
FIG. 10 is a fragmentary sectional elevation orthocological to the axis of the shaft as it penetrate the end wall of the vat of the present invention showing the preferred embodiment of the seal of the present invention.

As shown in FIG. 10, the preferred embodiment of the seal 68 is constructed to minimize the leakage of the vat contents from the interior of the vat 10, while at the same time allowing the seal to be cleaned to maintain hygienic conditions. The seal 68 is mounted in a tapered hole 100 larger than the diameter of the shaft 18 in each end section 28 of the end walls means 24. The seal 68 is held in place by an external seal retaining ring 102 secured to the outside of end section 28 by a series of mounting bolts 104. The seal 68 is made of a flexible material and includes an outer lip 106 in angular contact from the exterior to the interior of the vat 10 with the shaft 18. The seal 68 also include an inner lip 108 that is in angular contact with a step-in annular flange 19 on the shaft 18 positioned just inside of the ned section 28. The inner lip 108 angled outward from the surface of the shaft to engage the surface of the flange 19 that is facing the seal 68. The seal 68 further includes a cleaning port 110 that allows for the entry of cleaning fluid into the annular chamber 12 created between the outer lip 106 and the inner lip 108 of the seal 68.

In operation, the seal 68 is positioned in the tapered hole 100 so that the flange 19 compresses the inner lip 108 to form a leak proof joint between the interior of the vat 10 and the seal 68. Outer lip 106 forms a further seal to prevent the escape of the contents of the vat 10 around the shaft 18. In the event that the contents of the vat 10 leak through the seal formed by the inner lip 108, the leakage may be detected at the cleaning port 110 and the seal 68 may be replaced after the current cycle of food processing is complete. The seal 68 may be cleaned after each cycle of food processing by introducing a cleaning fluid under pressure through the cleaning port 110. The pressure causes the inner lip 108 to lift away from the flange 19 and allows any contaminants to be flushed into the interior of the vat 10 for cleaning. The same pressure also increase the seal of the outer lip 106 on the shaft 18, thereby preventing the cleaning solution from coming into contact with the bearings 64 and 66.

Referring now to FIG. 3, the food product may be drained from the inner shell means 12 through the outlet means 46 located near the bottom of the end wall means 26 between the inner wall sections 22. The outlet means 40 may also be used as an initial filling connection, or food product may be introduced into the vat to by way of a top inlet 70. To provide access to the interior of the vat 10 a manway 72 is provided that allows manual access to the interior of the vat 10 for cleaning and maintenance. The manway 72 is equipped with a hinged sealing mechanism 74 that when closed seal the vat 10 to the external atmosphere.

In the preferred embodiment, the vat 10 is constructed of dimensions that allow for 50,000 lbs of milk to be processed at one time. The radius of each of the inner wall sections 20 is 3'6". The overall length of the vat 10 is 15'6", with an overall height of 10'0" and an overall width of 12'0". As shown in FIG. 8, these dimensions allow for a product level of approximately 6' from the floor of the inner shell means 12 when the vat 10 is filled to capacity. Unlike food processing vats of the prior art, the size of vat 10 of the present invention may be increased relatively simply by increasing the length of the inner wall sections 20 and the shaft 18. This increase will allow the vat 10 to process greater quantities of product than could be processed using a vertically oriented vat.

Referring now to FIGS. 5 through 9, the agitator means 22 will be described. In the preferred embodiment, the agitator means 22 is comprised of a series of combined cutting and stirring paddles 80 that are mounted on each horizontal shaft 18 generally as shown in FIG. 5. These paddles 80 extend radially outward from the horizontal shaft 18 to points adjacent to the walls of the inner shell means 12 and may be arranged in staggered rows or in a row wrapped spirally around each horizontal shaft 18.

Each paddle 80 comprises blades 82, some of which act as side frames 84 set perpendicular to the horizontal shaft 18 with further blades 82 acting as connecting frame members 86 running parallel to the horizontal shaft 18 linking the side frames 84 together in pairs. Both the side frames 84 and the connecting frame members 86 are sharpened on one side only and one side of the side frame 20 in each pair is set at a slight angle to the direction of rotation, whilst the other side frame 20 is set parallel to the direction of rotation. This orientation of the blades 82 produces the propeller-like torrodial flow pattern that will be described in more detail hereinafter. Thin blades 22 that are sharpened on one side only are mounted on the connecting frame members 86 in such a way that the thin blades 88 are perpendicular to the horizontal shaft 18 and parallel to the direction of rotation. All sharpened edges of the side frames 84, the connecting frame members 86 and the thin blades 88 are oriented to face in the same direction relative to the horizontal shaft 18.

The individual paddles 80 are of a size such that they can be inserted into and removed from the vat 10 by means of the manway 76. In another form of the invention, the paddles 80 are arranged in a spiral configuration around each horizontal shaft 18. In still another form of the invention, some of the blades 82 in each paddle 80 are replaced by high tensile stainless steel wires held under tension. Although not limited to only one application, this form of agitator paddle is particularly useful when the vat 10 is to be used for the manufacture of cottage cheese or other soft curd varieties of food product.

The operation of the vat 10 will now be described. The food processing vat 10 may be used as a cheese vat for making various types of cheese, such as Cheddar, Granulated, Colby, Jack, Italian, Swiss, Cottage and the like. The vat 10 may also be used to process soybean curd or other proteinous coagulums. During operation of the vat 10 as a cheese vat, milk at a pre-determined temperature that has been treated with bacterial cultures, enzymes and other ingredients including color, calcium chloride, lactic acid, is introduced into the vat 10 by way of a pipe (not shown) connected to the inlet 36. The paddles 80 are used to stir or mix the contents of the vat 10 by rotating the shafts 18 in the direction that will present the non-sharpened edge of the blades 82 to the food product. After mixing, the mixture is allowed to rest for a period time during which the contents of the vat coagulate. After satisfactory coagulation, the horizontal shafts 18 are first rotated in one direction to present the sharpened edges of the blades 82 to the coagulum in order to achieve a cutting action until the coagulum is reduced to the desired mixture of curds and whey. Then, the paddles 80 are rotated in the opposite direction in order to achieve agitation of the curds and whey with a minimum of further cutting.

Heating and/or cooling of the contents can now take place during the agitation cycle. At normal rotational speed, the angled side frames 84 will act in a manner similar to a propeller and induce a generally torroidal flow of product around the vat. The horizontal flow is directed longitudinally down the outer edge of right inner wall section 20 and up the outer edge of the left inner wall section 20 by means of opposite handing of the angled side frames 84 on the left hand and right hand horizontal shafts 18. This ensures even distribution of heat in the contents of the vat 10.

After the desired amount of agitation is completed (depending upon the type of cheese product being made), the agitator means 22 may be turned off and some whey may be drawn from pre-draw port 90 as shown in FIG. 3. When this is completed, the agitator means 20 is turned on again to redistribute the curd in the remaining whey. Finally, the vat contents are emptied through the outlet 36 and the vat 10 is cleaned by means of high pressure sprays.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

I claim:

1. A vat for processing a generally liquid food product comprising:
   a plurality of generally horizontal shafts, each shaft having a rotatable agitator means for agitating the liquid food product and defining a swept volume created by rotation of the agitator means about the shaft, the shafts being horizontally spaced apart from one another by a distance greater than the larger of the radius of a swept volumes of adjacent shafts;
   a plurality of adjacent inner wall sections, each inner wall section corresponding to one of the horizontal shafts such that the horizontal shaft is centrally disposed within the inner wall section, the inner wall section having a vertical cross-section corresponding to a first portion of the swept volume created by the rotation of the agitator means about the shaft:
   a pair of end wall means for closing the ends of the inner wall sections, whereby the inner wall sections are arranged such that a second portion of the swept volume created by the rotation of the agitator means about the shaft will intersect and overlap a second portion of the swept volume created by the rotation of the agitator mean about the shaft of an adjacent inner wall section, wherein the end wall means are each comprised of a plurality of generally conically shaped end sections, each end section corresponding to an inner wall section and having a vertical base cross section corresponding to the vertical cross section of that inner wall section.

2. The food processing vat of claim 1 wherein each end section further comprises a bearing means centrally located in the apex of the end section for supporting the shaft and allowing the shaft to rotate therein.

3. The food processing vat of claim 1 wherein each end section further comprises a sealing means for sealing the shaft to prevent the contents of the vat from escaping around the shaft.

4. The food processing vat of claim 3 wherein the sealing means comprises an annular seal disposed in a tapered hole in the end section through which the shaft is disposed, the annular seal having an inner lip in angular contact with the surface of the shaft and an outer lip in angular contact with a step-in annular flange positioned on the shaft just inside of the end section and being held in place by an external retaining ring means.

5. The food processing vat of claim 1 further comprising:
   outer shell means surrounding a lower portion of the inner wall sections and defining an annular space between the inner wall sections and the outer shell for the application of a thermal media; and
   a plurality of spray nozzles disposed in the outer shell means for spraying a heating or cooling media onto the outer surface of the inner wall section and a thermal outlet for draining the heating or cooling media.

6. The food processing vat of claim 1 wherein the interior surface of each end section is generally dished.

7. A vat for processing a generally liquid food product comprising:
   a plurality of generally horizontal shafts, each shaft having rotatable agitator means for agitating the liquid food product and defining a swept volume created by rotation of the agitator means about the shaft, the shafts being horizontally spaced apart form one another by a distance greater than the larger of the radius of a swept volumes of adjacent shafts:
   a plurality of adjacent inner wall sections, each inner wall section corresponding to one of the horizontal shafts such that the horizontal shaft is centrally disposed within the inner wall section, the inner wall section having a vertical cross-section corresponding to a first portion of the swept volume created by the rotation of the agitator means about the shaft: and
   a pair of end wall means for closing the ends of the inner wall sections, whereby the inner wall sections are arranged such that a second portion of the swept volume created by the rotation of the agitator means about the shaft will intersect and overlap a second portion of the swept volume created by the rotation of the agitator means about the shaft of an adjacent inner wall section,
   wherein the agitator means is comprised of a series of blades extending radially outward from the shaft and arranged both perpendicular to the shaft and parallel to the shaft and the blades are sharpened on one side only and fixed in such a way that when the shaft is rotated in one direction the sharp edges of the blades will be presented to a food product in the vat and cutting of the food product will take place and when the shaft is rotated in the opposite direction the blunt sides of the blades will be presented to the food product and stirring of the food product will take place.

8. The food processing vat of claim 7 further comprising:
   outer shell means surrounding a lower portion of the inner wall sections and defining an annular space between the inner wall sections and the outer shell for the application of a thermal media; and
   a plurality of spray nozzles disposed in the outer shell means for spraying a heating or cooling media onto the outer surface of the inner wall section and a thermal outlet for draining the heating or cooling media.

9. The food processing vat of claim 7 wherein each end wall means is comprised of a plurality of generally conically shaped end sections, each end section corresponding to an inner wall section and having a vertical base cross section corresponding to the vertical cross section of that inner wall section and having an interior surface that is generally dished.

10. The food processing vat of claim 7 wherein each end section further comprises a bearing means centrally located in the apex of the end section for supporting the shaft and allowing the shaft to rotate therein.

11. The food processing vat of claim 9 wherein each end section further comprises a sealing means for sealing the shaft to prevent the contents of the vat from escaping around the shaft.

12. The food processing vat of claim 11 wherein the sealing means comprises an annular seal disposed in a tapered hole in the end section through which the shaft is disposed, the annular seal having an inner lip in angular contact with the surface of the shaft and an outer lip in angular contact with a step-in annular flange positioned on the shaft just inside of the end section and being held in place by an external retaining ring means.

13. A vat for processing a generally liquid food product comprising:
   cradle means for supporting the vat;
   an outer shell means operably connected to the cradle means for applying a thermal media to the vat to heat and cool the food product contents of the vat, the outer shell means having a generally elliptical cylinder shape with the longitudinal axis generally oriented horizontally;
   an inner shell means operably connected to the outer shell means for containing the food product contents of the vat, the inner shell means comprising two partial cylindrical inner wall sections, each inner wall section having a longitudinal wall section having a generally C-shaped vertical crosssection and being a mirror image of one another and a pair of end wall sections operably connected to the longitudinal wall section having a generally outward conical shape and a vertical base cross section corresponding to the vertical cross section of the longitudinal wall section;
   shaft means disposed within the inner shell means and extending through at least one end of the inner shell means for stirring the food product contents, the shaft means comprising two generally horizontal shafts, each shaft having a series of rotatable paddles extending radially outward from the shaft defining a swept volume created by rotation of the paddles about the shaft, the shafts being horizontally spaced apart from one another by a distance greater than the larger of the radius of a swept volumes of adjacent shafts; and
   drive means operably connected to the shaft means for rotating the shaft means.

14. A vat for processing a generally liquid food product comprising:
   a plurality of generally horizontal shafts, each shaft having a rotatable agitator means for agitating the liquid food product and defining a swept volume created by rotation of the agitator means about the shaft, the shafts being horizontally spaced apart from one another by a distance greater than the larger of the radius of a swept volumes of adjacent shafts;
   a plurality of adjacent inner wall sections, each inner wall section corresponding to one of the horizontal shafts such that the horizontal shaft is centrally disposed within the inner wall section, the inner wall section having a vertical cross-section corresponding to a first portion of the swept volume created by the rotation of the agitator means about the shaft;

a pair of end wall means for closing the ends of the inner wall sections, whereby the inner wall sections are arranged such that a second portion of the swept volume created by the rotation of the agitator means about the shaft will intersect and overlap a second portion of the swept volume created by the rotation of the agitator means about the shaft of an adjacent inner wall section;

cradle means for supporting and stabilizing the vat in an upright position;

outer shell means surrounding a lower portion of the inner wall sections and defining an annular space between the inner wall sections and the outer shell for the application of a thermal media;

a plurality of spray nozzles disposed in the outer shell means for spraying a heating or cooling media onto the outer surface of the inner wall section and a thermal outlet for draining the heating or cooling media; and access means for introducing the food product into the vat and draining the food product from the vat comprising an inlet and an outlet, wherein the outlet is located in the bottom of one of the end wall means and wherein the cradle means is higher at the opposite end wall means to longitudinally tilt the vat thereby allowing the food product to flow toward the outlet in the lower end wall means.

15. A vat for processing a generally liquid food product comprising:

a plurality of generally horizontal shafts, each shaft having a rotatable agitator means for agitating the liquid food product and defining a swept volume created by rotation of the agitator means about the shaft, the shafts being horizontally spaced apart form one another by a distance greater than the larger of the radius of a swept volumes of adjacent shafts;

a plurality of adjacent inner wall sections, each inner wall section corresponding to one of the horizontal shafts such that the horizontal shaft is centrally disposed within the inner wall section, the inner wall section having a vertical cross-section corresponding to a first portion of the swept volume created by the rotation of the agitator means about the shaft;

a pair of end wall means for closing the ends of the inner wall sections, whereby the inner wall sections are arranged such that a second portion of the swept volume created by the rotation o the agitator means about the shaft will intersect and overlap a second portion of the swept volume created by the rotation of the agitator means about the shaft of an adjacent inner wall section, wherein each end wall means is comprised of a plurality of generally conically shaped end sections, each end section corresponding to an inner wall section and having a vertical base cross section corresponding to the vertical cross section of that inner wall section and having an interior surface that is generally dished;

cradle means for supporting and stabilizing the vat in an upright position;and access means for introducing the food product into the vat and draining the food product from the vat comprising an inlet and an outlet, wherein the outlet is located in the bottom of one of the end wall means and wherein the cradle means is higher at the opposite end wall means to longitudinally tilt the vat thereby allowing the food product to flow toward the outlet in the lower end wall means.

16. The food processing vat of claim 10 wherein each end section further comprises a bearing means centrally located in the apex of the end section for supporting the shaft and allowing the shaft to rotate therein.

17. The food processing vat of claim 10 wherein each end section further comprises a sealing means for sealing the shaft to prevent the contents of the vat from escaping around the shaft.

18. The food processing vat of claim 17 wherein the sealing means comprises an annular seal disposed in a tapered hole in the end section through which the shaft is disposed, the annular seal having an inner lip in angular contact with the surface of the shaft and an outer lip in angular contact with a step-in annular flange positioned on the shaft just inside of the end section and being held in place by an external retaining ring means.

19. The food processing vat of claim 7 wherein certain of the perpendicular blades are oriented at an angle of impingement such that when the shaft is rotated the perpendicular blades will act on a food product in the vat in a propeller-like manner to create a generally torroidal flow pattern of the food product around the vat.

20. The food processing vat of claim 7 wherein certain of the blades in each paddle are high tensile stainless steel wires held under tension.

* * * * *

UNITED STATES PATENT AND TRADEMARK OFFICE
CERTIFICATE OF CORRECTION

PATENT NO. : 4,989,504

DATED : February 5, 1991

INVENTOR(S) : Jeffrey L. Jay

It is certified that error appears in the above-identified patent and that said Letters Patent is hereby corrected as shown below:

Col. 1, line 27, delete "or" and insert --of-- therefore;

Col. 1, line 49, delete "singing" and insert --swinging-- therefore;

Col. 1, line 55, after "paddles" insert --of the agitator. This approach offers some advantages in that the cutting and stirring paddles-- therefore;

Col. 2, line 26, delete "an" and insert --a-- therefore;

Col. 2, line 29, delete "the" and insert --The-- therefore;

Col. 3, line 9, delete "o" after the word "contamination" and insert --to -- therefore;

Col. 6, line 11, delete "ned" and insert --end-- therefore;

Col. 6, line 16, delete "12" and insert --112-- therefore;

Col. 8, Line 47, delete "mean" and insert --means-- therefore;

UNITED STATES PATENT AND TRADEMARK OFFICE
CERTIFICATE OF CORRECTION

PATENT NO. : 4,989,504

DATED : February 5, 1991

INVENTOR(S) : Jeffry L. Jay

It is certified that error appears in the above-identified patent and that said Letters Patent is hereby corrected as shown below:

Col. 9, line 23, delete "form" and insert --from-- therefore;

Col. 11, line 37, delete "form" and insert --from-- therefore.

Signed and Sealed this

Eighth Day of September, 1992

*Attest:*

DOUGLAS B. COMER

*Attesting Officer*      *Acting Commissioner of Patents and Trademarks*